United States Patent
Minamiguchi et al.

(10) Patent No.: US 11,209,457 B2
(45) Date of Patent: Dec. 28, 2021

(54) ABNORMALITY DETECTION DEVICE, ABNORMALITY DETECTION METHOD, AND NON-TRANSITORY TANGIBLE COMPUTER READABLE MEDIUM

(71) Applicant: DENSO CORPORATION, Kariya (JP)

(72) Inventors: Yuuichi Minamiguchi, Kariya (JP); Kenji Miyake, Kariya (JP); Kenta Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/878,879

(22) Filed: May 20, 2020

(65) Prior Publication Data

US 2020/0371131 A1    Nov. 26, 2020

(30) Foreign Application Priority Data

May 23, 2019  (JP) .............................. JP2019-097076

(51) Int. Cl.
| | |
|---|---|
| *G01P 21/00* | (2006.01) |
| *G01P 3/44* | (2006.01) |
| *B60R 11/04* | (2006.01) |
| *G01P 3/50* | (2006.01) |
| *B60R 11/00* | (2006.01) |

(52) U.S. Cl.
CPC .............. *G01P 21/00* (2013.01); *B60R 11/04* (2013.01); *G01P 3/44* (2013.01); *G01P 3/50* (2013.01); *B60R 2011/004* (2013.01)

(58) Field of Classification Search
CPC .... B60R 11/04; B60R 2011/004; G01P 21/00; G01P 3/44; G01P 3/50
See application file for complete search history.

(56) References Cited

U.S. PATENT DOCUMENTS

| | | | |
|---|---|---|---|
| 7,524,106 B2 * | 4/2009 | Higashiyama | ........... F01P 11/16 123/41.05 |
| 9,778,040 B1 * | 10/2017 | Lascone | ............... G01C 21/165 |
| 2014/0309852 A1 * | 10/2014 | Ricci | ....................... B60Q 9/00 701/34.4 |

FOREIGN PATENT DOCUMENTS

| | | |
|---|---|---|
| JP | 2008-249639 A | 10/2008 |
| JP | 2009-74859 A | 4/2009 |
| JP | 5314548 B2 | 7/2013 |
| JP | 2017-219429 A | 12/2017 |

* cited by examiner

*Primary Examiner* — Elias Desta
(74) *Attorney, Agent, or Firm* — Maschoff Brennan

(57) ABSTRACT

An abnormality is detected in a sensor system mounted on a vehicle and including first and second external sensors for acquiring external information and an internal sensor for acquiring internal information. An error, occurring in an internal motion physical quantity based on the internal information, is estimated based on the external information, and the error is corrected. A first external motion physical quantity based on the external information acquired by the first external sensor, a second external motion physical quantity based on the external information acquired by the second external sensor, and the internal motion physical quantity in which the error is corrected by the correction block are compared to determine an abnormality in the sensor system.

11 Claims, 9 Drawing Sheets

FIG. 4

| ESTABLISHMENT OF EX. 6 $\|\gamma_t - \gamma_{ca}\| < n \cdot \sqrt{\sigma_t^2 + \sigma_{ca}^2}$ | ESTABLISHMENT OF EX. 7 $\|\gamma_t - \gamma_{gn}\| < n \cdot \sqrt{\sigma_t^2 + \sigma_{gn}^2}$ | ESTABLISHMENT OF EX. 8 $\|\gamma_{gn} - \gamma_{ca}\| < n \cdot \sqrt{\sigma_{gn}^2 + \sigma_{ca}^2}$ | DETERMINATION OF ABNORMALITY |
|---|---|---|---|
| ○ | ○ | (○) | NO ABNORMALITY IN SENSOR SYSTEM |
| × | ○ | ○ | GYROSCOPE WITH ABNORMALITY |
| × | ○ | × | CAMERA WITH ABNORMALITY |
| ○ | × | ○ | GYROSCOPE WITH ABNORMALITY |
| ○ | × | × | GNSS RECEIVER WITH ABNORMALITY |
| × | × | ○ | GYROSCOPE WITH ABNORMALITY |
| × | × | × | EXTERNAL SENSOR WITH ABNORMALITY |

FIG. 10

| ESTABLISHMENT OF EX. 13 $\|V_t - V_{li}\| < m \cdot \sqrt{\delta_t^2 + \delta_{li}^2}$ | ESTABLISHMENT OF EX. 14 $\|V_t - V_{gn}\| < m \cdot \sqrt{\delta_t^2 + \delta_{gn}^2}$ | ESTABLISHMENT OF EX. 15 $\|V_{gn} - V_{li}\| < m \cdot \sqrt{\delta_{gn}^2 + \delta_{li}^2}$ | DETERMINATION OF ABNORMALITY |
|---|---|---|---|
| ○ | ○ | (○) | NO ABNORMALITY IN SENSOR SYSTEM |
| × | ○ | ○ | WHEEL SPEED SENSOR WITH ABNORMALITY |
| × | ○ | × | LIDAR WITH ABNORMALITY |
| ○ | × | ○ | WHEEL SPEED SENSOR WITH ABNORMALITY |
| ○ | × | × | GNSS RECEIVER WITH ABNORMALITY |
| × | × | ○ | WHEEL SPEED SENSOR WITH ABNORMALITY |
| × | × | × | EXTERNAL SENSOR WITH ABNORMALITY |

US 11,209,457 B2

ABNORMALITY DETECTION DEVICE, ABNORMALITY DETECTION METHOD, AND NON-TRANSITORY TANGIBLE COMPUTER READABLE MEDIUM

CROSS REFERENCE TO RELATED APPLICATION

The present application claims the benefit of priority from Japanese Patent Application No. 2019-097076 filed on May 23, 2019. The entire disclosure of the above application is incorporated herein by reference.

TECHNICAL FIELD

The present disclosure relates to a technique for detecting an abnormality of a sensor system mounted on a vehicle.

BACKGROUND

Conventionally, an external sensor such as a camera is mounted on a vehicle in order to acquire external information. In order to acquire internal information, an internal sensor such as a gyroscope is mounted on the vehicle. The information acquired by each of the external and internal sensors is utilized in a motion estimation of the vehicle, such as a self-localization.

SUMMARY

According to an example embodiment, an abnormality is detected in a sensor system mounted on a vehicle and including first and second external sensors for acquiring external information and an internal sensor for acquiring internal information. An error, occurring in an internal motion physical quantity based on the internal information, is estimated based on the external information, and the error is corrected. A first external motion physical quantity based on the external information acquired by the first external sensor, a second external motion physical quantity based on the external information acquired by the second external sensor, and the internal motion physical quantity in which the error is corrected by the correction block are compared to determine an abnormality in the sensor system.

BRIEF DESCRIPTION OF THE DRAWINGS

The above and other objects, features and advantages of the present disclosure will become more apparent from the following detailed description made with reference to the accompanying drawings. In the drawings:

FIG. 4 is a table illustrating an abnormality determination according to the first embodiment.

FIG. 10 is a table illustrating an abnormality determination according to the second embodiment.

DETAILED DESCRIPTION

Figure 1:
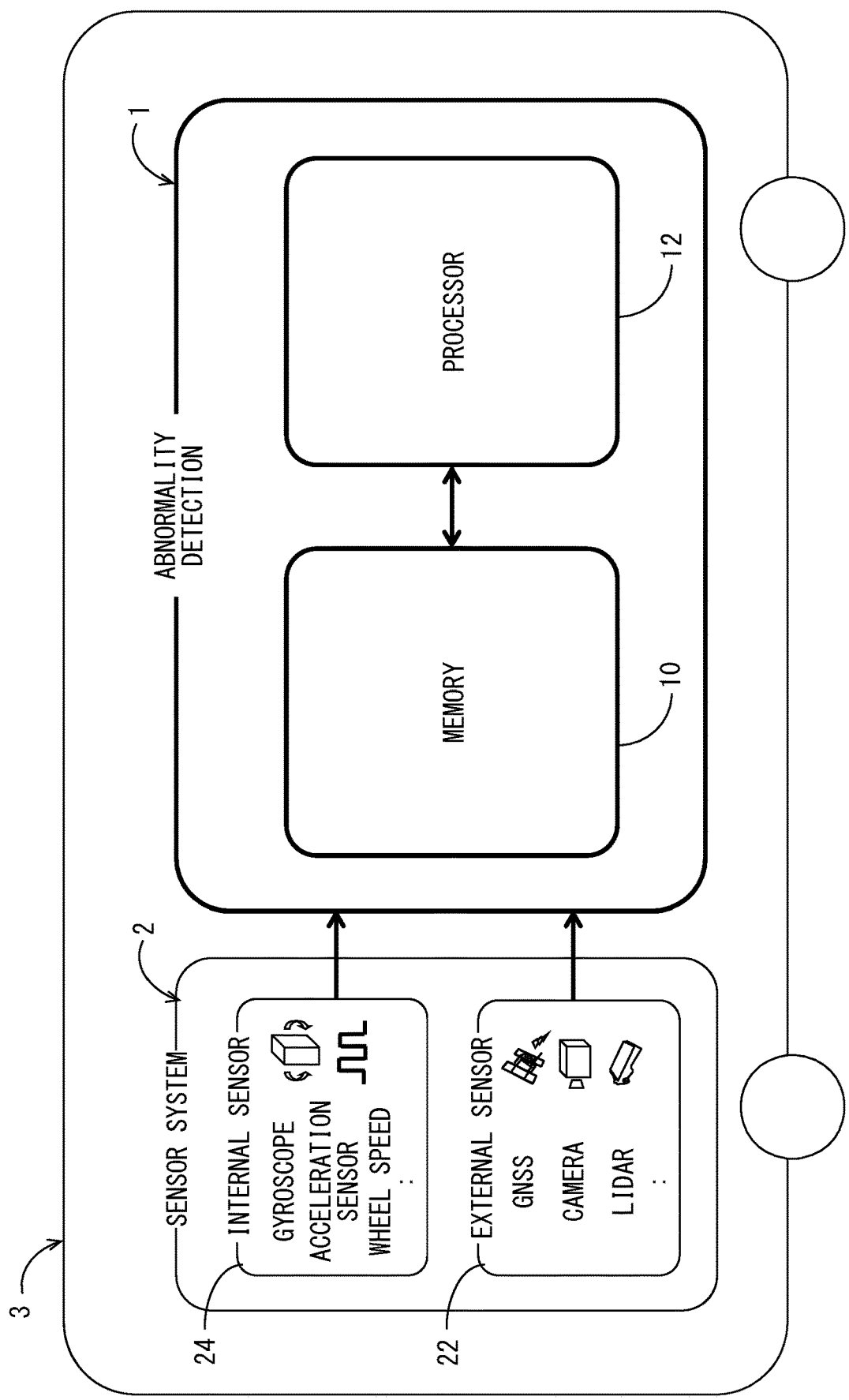
FIG. 1 is a block diagram showing an overall configuration of an abnormality detection device according to a first embodiment.

In a conceivable technique, an error inherent in each of the external sensor and the internal sensor is reflected in the motion estimation of the vehicle. However, it is conceivable that the above technique is based on the assumption that neither the external sensor nor the internal sensor has any abnormality. For that reason, when there is an abnormality in either of the external sensor and the internal sensor, if the abnormality is not correctly detected, the accuracy may be lowered in the motion estimation that only reflects the sensor error.

Thus, an abnormality detection device is provided for correctly detecting an abnormality of a sensor system mounted on a vehicle including an external sensor and an internal sensor.

Further, an abnormality detection method is provided for correctly detecting an abnormality of a sensor system mounted on a vehicle including an external sensor and an internal sensor.

Further, a non-transitory tangible computer readable medium is provided for a method for correctly detecting an abnormality of a sensor system mounted on a vehicle including an external sensor and an internal sensor.

According to an example embodiment, an abnormality detection device that detects an abnormality of a sensor system which is mounted on a vehicle and includes a first external sensor and a second external sensor that acquire external information and an internal sensor that acquires internal information, the abnormality detection device includes: a correction block that estimates an error, occurring in an internal motion physical quantity based on the internal information acquired by the internal sensor as a specific comparison motion physical quantity, based on the external information acquired by at least one of the first external sensor and the second external sensor, and corrects the error; and a determination block that compares a first external motion physical quantity based on the external information acquired by the first external sensor as a comparison motion physical quantity, a second external motion physical quantity based on the external information acquired by the second external sensor as another comparison motion physical quantity, and the internal motion physical quantity in which the error is corrected by the correction block, and determines an abnormality in the sensor system.

According to an example embodiment, an abnormality detection method for detecting an abnormality of a sensor system which is mounted on a vehicle and includes a first external sensor and a second external sensor that acquire external information and an internal sensor that acquires internal information, the abnormality detection method includes: estimating an error, occurring in an internal motion physical quantity based on the internal information acquired by the internal sensor as a specific comparison motion physical quantity, based on the external information acquired by at least one of the first external sensor and the second external sensor; correcting the error; comparing a first external motion physical quantity based on the external information acquired by the first external sensor as a comparison motion physical quantity, a second external motion physical quantity based on the external information acquired by the second external sensor as another comparison motion physical quantity, and the internal motion physical quantity in which the error is corrected; and determining an abnormality in the sensor system.

According to an example embodiment, a non-transitory tangible computer readable medium comprising instructions being executed by a computer, the instructions including a computer-implemented method for detecting an abnormality of a sensor system which is mounted on a vehicle and includes a first external sensor and a second external sensor that acquire external information and an internal sensor that acquires internal information, the instructions includes: estimating an error, occurring in an internal motion physical quantity based on the internal information acquired by the internal sensor as a specific contrast motion physical quantity, based on the external information acquired by at least one of the first external sensor and the second external sensor; correcting the error; comparing a first external motion physical quantity based on the external information acquired by the first external sensor as a comparison motion physical quantity, a second external motion physical quantity based on the external information acquired by the second external sensor as another comparison motion physical quantity, and the internal motion physical quantity in which the error is corrected; and determining an abnormality in the sensor system.

In the above embodiments, the error of the internal motion physical quantity based on the information acquired by the internal sensor can be accurately estimated based on the information acquired by at least one of the first and second external sensors. Moreover, the first and second external motion physical quantities based on the information acquired by the first and second external sensors are compared with each other together with the internal motion physical quantity for which the error is corrected. This makes it possible not only to determine the presence or absence of an abnormality in the sensor system as a whole, but also to accurately identify a sensor with abnormality and a sensor with no abnormality. According to the above configuration, the abnormality of the sensor system can be accurately detected.

Hereinafter, multiple embodiments will be described with reference to the drawings. It should be noted that the same reference numerals are assigned to corresponding components in the respective embodiments, and overlapping descriptions may be omitted. When only a portion of a configuration in each embodiment is described, with respect to other portions of the configuration, configurations of other embodiments described in advance can be applied. Further, not only the combinations of the configurations explicitly shown in the description of the respective embodiments, but also the configurations of the plurality of embodiments can be partially combined together even if the configurations are not explicitly shown if there is no problem in the combination in particular.

First Embodiment

As shown in FIG. 1, an abnormality detection device 1 according to a first embodiment of the present invention is mounted on a vehicle 3 together with a sensor system 2. The sensor system 2 of the vehicle 3 includes an external sensor 22 and an internal sensor 24.

The external sensor 22 acquires information usable for motion estimation of the vehicle 3 as external information from an outside, which is a surrounding environment of the vehicle 3. The external sensor 22 may acquire the external information by detecting an object existing in the outside of the vehicle 3. The external sensor 22 of the detection type is at least one of a camera, a LIDAR (Light Detection and Ranging/Laser Imaging Detection and Ranging), a radar, sonar, and the like, for example. The external sensor 22 may acquire the external information by receiving a signal from an artificial satellite of a GNSS (Global Navigation Satellite System) present in the outside of the vehicle 3 or a signal from a roadside device of ITS (Intelligent Transport Systems). The external sensor 22 of the reception type is at least one of, for example, a GNSS receiver, a telematics receiver, and the like.

The internal sensor 24 acquires, as internal information, information usable for the motion estimation of the vehicle 3 from an inside, which is the internal environment of the vehicle 3. The internal sensor 24 may acquire the internal information by detecting a specific motion physical quantity in the inside of the vehicle 3. The internal sensor 24 of the detection type is, for example, at least one of a gyroscope, a wheel speed sensor, an acceleration sensor, and the like.

Figure 2:
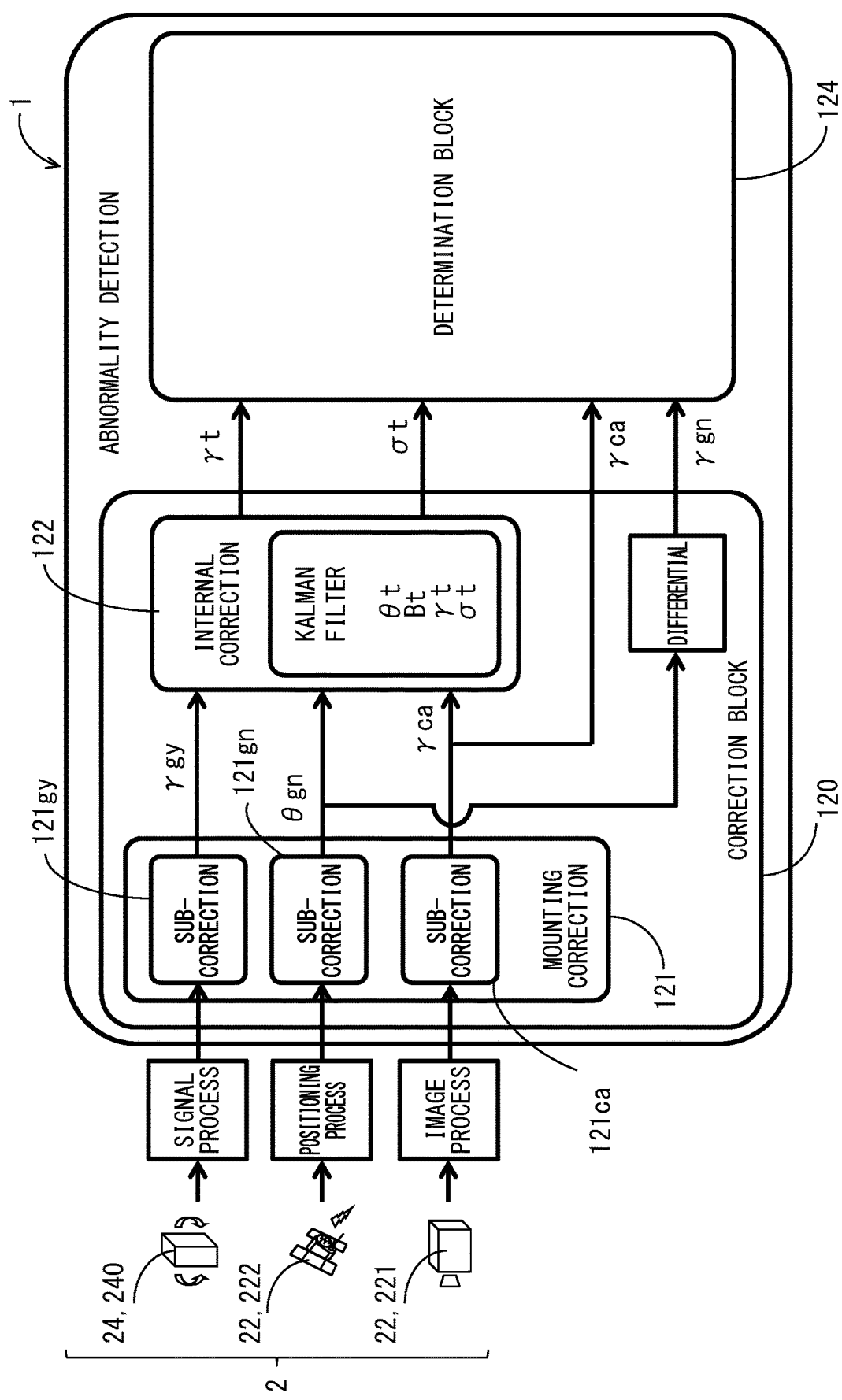
FIG. 2 is a block diagram showing a detailed configuration of the abnormality detection device according to the first embodiment.
Figure 3:
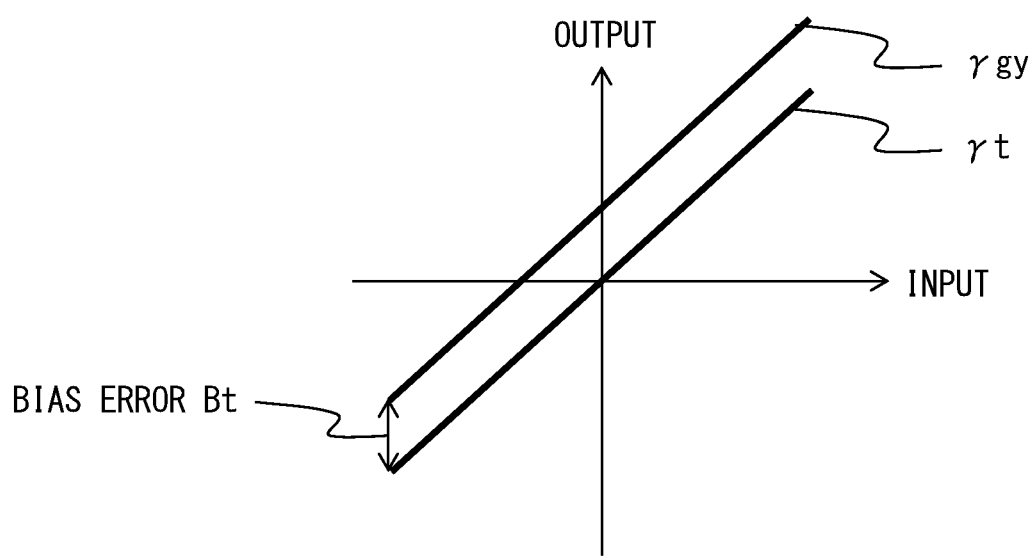
FIG. 3 is a graph illustrating an error correction according to the first embodiment.

As shown in FIG. 2, in the first embodiment, a camera 221 as a "first external sensor" and a GNSS receiver 222 as a "second external sensor" are employed as at least two external sensors 22 required for the sensor system 2. In the first embodiment, a gyroscope 240 is employed as at least one internal sensor 24 necessary for the sensor system 2.

As shown in FIG. 1, the abnormality detection device 1 according to the first embodiment is connected to the sensors 22 and 24 of the sensor system 2 through at least one of, for example, a LAN (Local Area Network), wire harnesses, and internal buses. The abnormality detection device 1 includes at least one control unit. The abnormality detection device 1 may be an ECU (Electronic Control Unit) of a locator that estimates a self-position of the vehicle 3. The abnormality detection device 1 may be an ECU that controls an advanced driving support or an autonomous driving of the vehicle 3. The abnormality detection device 1 may be an ECU that controls a communication between the vehicle 3 and the outside.

The abnormality detection device 1 is a computer configured to include at least one of a memory 10 and a processor 12. The memory 10 is at least one type of non-transitory tangible storage medium, such as a semiconductor memory, a magnetic medium, and an optical medium, for non-transitory storage of computer readable programs and data. The processor 12 includes, as a core, at least one type of, for example, a CPU (Central Processing Unit), a GPU (Graphics Processing Unit), an RISC (Reduced Instruction Set Computer)—CPU, and so on. The processor 12 executes multiple commands included in an abnormality detection program stored in the memory 10. As a result, the abnormality detection device 1 establishes multiple functional blocks for detecting the abnormality of the sensor system 2 as shown in FIG. 2.

The functional blocks established in the abnormality detection device 1 include a correction block 120 and a determination block 124. The correction block 120 corrects an error occurring in the motion physical quantity based on the information acquired by the sensor system 2. The determination block 124 determines whether or not the sensor system 2 is abnormal by contrasting the motion physical quantity which is based on the information acquired by the sensor system 2 and whose error has been corrected by the correction block 120. Those blocks 120 and 124 will be described in more detail below.

As shown in FIG. 2, the correction block 120 includes a mounting correction unit 121 and an internal correction unit 122. The mounting correction unit 121 corrects an error caused by a difference in mounting position in the vehicle 3 among the elements 221, 222, and 240 of the sensor system 2.

Specifically, a yaw angular velocity $\gamma ca$ of the vehicle 3 is input to a sub-correction unit 121$ca$ of the mounting correction unit 121 by image processing based on the image information acquired by the camera 221. The sub-correction unit 121$ca$ corrects an error caused by the mounting position included in the yaw angular velocity $\gamma ca$ based on preset information, for example, at the time of factory shipment or the like. The sub-correction unit 121$ca$ inputs the yaw angular velocity $\gamma ca$ whose error has been corrected to each of the internal correction unit 122 and the determination block 124.

A yaw angle $\theta gn$ of the vehicle 3 is input to a sub-correction unit 121$gn$ of the mounting correction unit 121 by the positioning process based on the positioning information acquired by the GNSS receiver 222. The sub-correction unit 121$gn$ corrects an error caused by the mounting position included in the yaw angle $\theta gn$ based on the preset information, for example, at the time of factory shipment or the like. The sub-correction unit 121$gn$ inputs the yaw angle $\theta gn$ whose error has been corrected to the internal correction unit 122. The sub-correction unit 121$gn$ inputs a time differential value of the yaw angle $\theta gn$ whose error has been corrected as the yaw angular velocity $\gamma gn$ to the determination block 124.

The yaw angular velocity $\gamma gy$ of the vehicle 3 is input to a sub-correction unit 121$gy$ of the mounting correction unit 121 by signal processing based on inertia information acquired by the gyroscope 240. The sub-correction unit 121$gy$ corrects an error caused by the mounting position included in the yaw angular velocity $\gamma gy$ based on the preset information, for example, at the time of factory shipment or the like. The sub-correction unit 121$gy$ inputs the yaw angular velocity $\gamma gy$ whose error has been corrected to the internal correction unit 122.

The internal correction unit 122 estimates a bias error Bt generated in the yaw angular velocity $\gamma gy$ based on information acquired by the gyroscope 240, and corrects a bias error Bt with respect to the yaw angular velocity $\gamma gy$. The bias error Bt is an error representing a variation amount at a zero point due to a temperature change of the gyroscope 240 in the vehicle 3, and can be estimated and corrected as a variation amount from a true value of the yaw angular velocity $\gamma gy$ (that is, $\gamma t$ to be estimated which will be described later).

Therefore, the internal correction unit 122 estimates and corrects the bias error Bt by passing the bias error Bt through a Kalman filter as shown in FIG. 2. In the Kalman filter of the first embodiment, the following Prediction Expressions 1 to 3 for the gyroscope 240 are assumed. Incidentally, in any of the Expressions to be described later, characters corresponding to suffixes attached to variables such as the motion physical quantities are indicated as subscripts for the sake of convenience for accurate understanding of the description.

[Ex. 1]

$$\theta_t = \theta_{t-1} + \gamma_t \cdot \Delta t + w_\theta \quad \text{Expression 1}$$

$$B_t = B_{t-1} + w_b \quad \text{Expression 2}$$

$$\gamma_t = \gamma_{gy} + B_t + w_{gy} \quad \text{Expression 3}$$

Specifically, Prediction Expression 1 is expressed by use of yaw angles $\theta t$ and $\theta t-1$ predicted at the present time t and a previous time t-1, a yaw angular velocity $\gamma t$ predicted at the present time t, a time interval $\Delta t$ between the present time t and the previous time t-1, and a system noise $w\theta$. Prediction Expression 2 is expressed by use of bias errors Bt and Bt-1 of the gyroscope 240 predicted at the present time t and the previous time t-1, and a system noise wb. Prediction Expression 3 is expressed by use of a yaw angular velocity $\gamma t$ predicted at the present time t, a yaw angular velocity $\gamma gy$ based on information acquired by the gyroscope 240 observed at the present time t, a bias error Bt predicted at the present time t, and a system noise wgy.

The Kalman filter according to the first embodiment also assumes the following Observation Expressions 4 and 5 for each of the camera 221 and the GNSS receiver 222.

[Ex. 2]

$$\gamma_{ca} = \gamma_t + w_{ca} \quad \text{Expression 4}$$

$$\theta_{gn} = \theta_t + w_{gn} \quad \text{Expression 5}$$

Specifically, Observation Expression 4 is expressed by use of the yaw angular velocity $\gamma ca$ based on the information acquired from the camera 221, which is observed at the present time t, the yaw angular velocity $\gamma t$ predicted at the present time t, and an observation noise wca. Observation Expression 5 is expressed by use of the yaw angle $\theta gn$ based on the information acquired by the GNSS receiver 222, which is observed at the present time t, a yaw angle $\theta t$ predicted at the present time t, and an observation noise wgn.

In the Kalman filter according to the first embodiment, a covariance matrix for $\theta t$, Bt, $\gamma t$ and their motion physical quantities shown in FIG. 2 are further derived by an estimation calculation based on a determinant expressing Prediction Expressions 1 to 3 and a determinant expressing Observation Expressions 4 and 5. As a result, the bias error Bt and the yaw angular velocity $\gamma t$ as the yaw angular velocity $\gamma gy$ whose bias error Bt has been corrected are estimated. At the same time, a variance $\sigma t$ corresponding to the estimated yaw angular velocity $\gamma t$ is estimated from the covariance matrix as shown in FIG. 2. The internal correction unit 122 inputs the yaw angular velocity $\gamma t$ and the variance $\sigma t$ thus estimated to the determination block 124.

The determination block 124 contrasts the yaw angular velocity $\gamma ca$ as the "first external motion physical quantity", the yaw angular velocity $\gamma gn$ as the "second external motion physical quantity", and the yaw angular velocity $\gamma t$ as the "internal motion physical quantity" with each other. As described above, in the first embodiment, the yaw angular velocities $\gamma t$, $\gamma ca$, and $\gamma gn$, which are the "angular velocities" around a yaw axis of the vehicle 3, correspond to the "specific contrast motion physical quantities" which are contrasted at the time of abnormality determination as the physical quantity relating to the motion of the vehicle 3.

Therefore, the determination block 124 determines whether or not there is an abnormality in the sensor system 2 according to the following Contrast Expressions 6 to 8 for contrasting the yaw angular velocities $\gamma t$, $\gamma ca$, and $\gamma gn$ with each other.

[Ex. 3]

$$|\gamma_t - \gamma_{ca}| < n \cdot \sqrt{\sigma_t^2 + \sigma_{ca}^2} \quad \text{Expression 6}$$

$$|\gamma_t - \gamma_{gn}| < n \cdot \sqrt{\sigma_t^2 + \sigma_{gn}^2} \quad \text{Expression 7}$$

$$|\gamma_{gn} - \gamma_{ca}| < n \cdot \sqrt{\sigma_{gn}^2 + \sigma_{ca}^2} \quad \text{Expression 8}$$

Specifically, Contrast Expression 6 is established when an absolute difference of the left side, which is a difference value between the yaw angular velocity γca and the yaw angular velocity γt, falls within an allowable range that is less than a threshold of the right side. In Contrast Expression 6, σt and σca are the variances of the yaw angular velocities γt and γca after error correction, respectively, and n is a multiple of a standard deviation that determines the allowable range. In other words, in Contrast Expression 6, the allowable range is set based on the variance σt of the yaw angular velocity γt obtained by correcting the bias error Bt for the gyroscope 240 and the variance σca of the yaw angular velocity γca for the camera 221.

Contrast Expression 7 is established when an absolute difference of the left side, which is a difference value between the yaw angular velocity γgn and the yaw angular velocity γt, falls within the allowable range that is less than the threshold of the right side. In Contrast Expression 7, σt and σgn are the variances of the yaw angular velocities γt and γgn after error correction, respectively, and n is a multiple of the standard deviation that determines the allowable range. In other words, in Contrast Expression 7, the allowable range is set based on the variance σt of the yaw angular velocity γt obtained by correcting the bias error Bt for the gyroscope 240 and the variance σgn of the yaw angular velocity γgn for the GNSS receiver 222.

Contrast Expression 8 is established when an absolute difference of the left side, which is a difference value between the yaw angular velocity γca and the yaw angular velocity γgn, falls within the allowable range that is less than the threshold value of the right side. In Contract Expression 8, σca and σgn are the variances of the yaw angular velocities γca and γgn after error correction, respectively, and n is a multiple of the standard deviation that determines the allowable range. In other words, in Contrast Expression 8, the allowable ranges are set based on the respective variances σca and σgn of the yaw angular velocities γca and γgn with respect to the camera 221 and the GNSS receiver 222.

Figure 5:
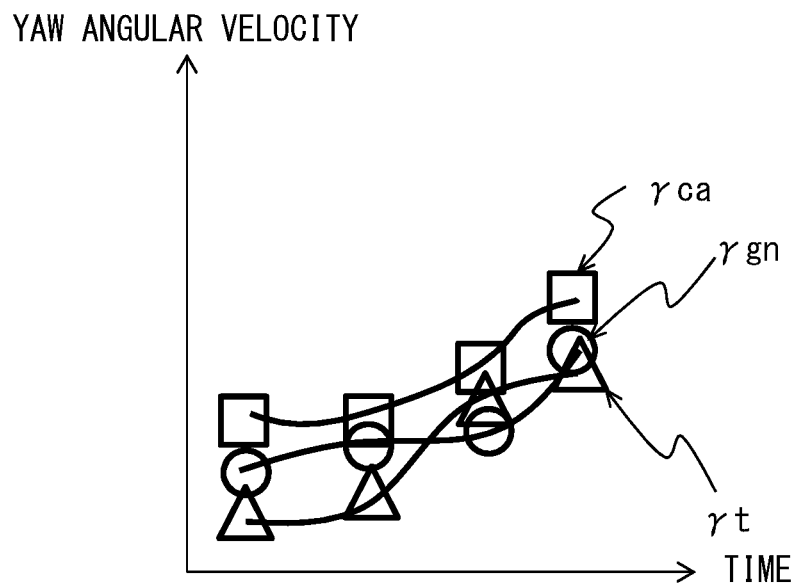
FIG. 5 is a graph illustrating an abnormality determination according to the first embodiment.

As shown in FIG. 4, the determination block 124 determines that there is no abnormality in the sensor system 2 when all of Contrast Expressions 6 to 8 are satisfied (see FIG. 5). In other words, the determination at the present time t at which the difference value of the yaw angular velocity γt from each of the yaw angular velocities γca and γgn falls within the allowable range and the difference value between the yaw angular velocities γca and γgn falls within the allowable range is made that there is no abnormality in all of the elements 221, 222, and 240 in the sensor system 2. The possibility that Contrast Expression 8 is not established when Contrast Expressions 6 and 7 are established is extremely low under the estimation through the Kalman filter described above. Therefore, it may be determined that there is no abnormality in the sensor system 2 with only the establishment of Contrast Expressions 6 and 7 regardless of whether Contrast Expression 8 is established.

Figure 6:
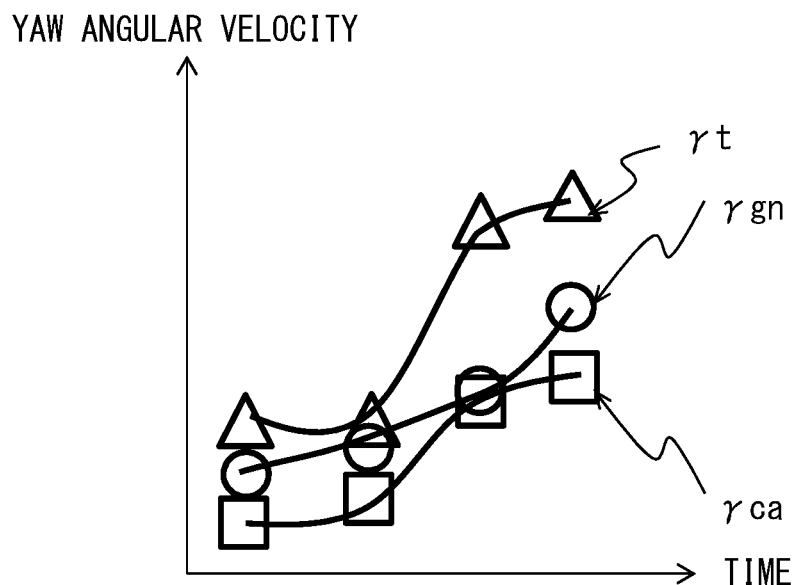
FIG. 6 is a graph illustrating the abnormality determination according to the first embodiment.

The determination block 124 identifies the gyroscope 240 in the sensor system 2 and determines that there is an abnormality when Contrast Expressions 7 and 8 are established while Contrast Expression 6 is not established (see FIG. 6). In other words, the determination at the present time t at which the respective difference values between the yaw angular velocities γgn and γt and between the yaw angular velocities γca and γgn fall within the allowable range, but the difference value between the yaw angular velocities γca and γt falls outside the allowable range is made that there is an abnormality in the gyroscope 240 and there is no abnormality in the other elements 221 and 222.

Figure 7:
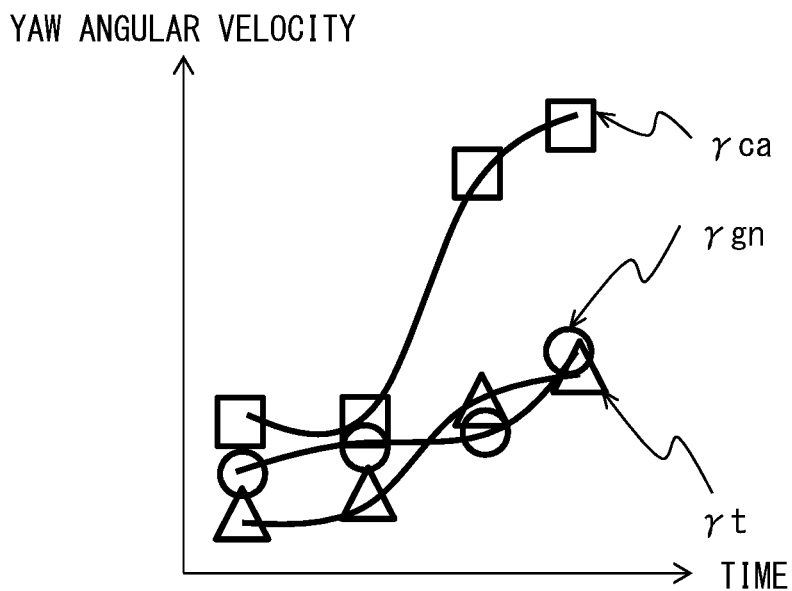
FIG. 7 is a graph illustrating the abnormality determination according to the first embodiment.

The determination block 124 identifies the camera 221 in the sensor system 2 and determines that there is an abnormality when Contrast Expression 7 is satisfied and Contrast Expressions 6 and 8 are not satisfied (see FIG. 7). In other words, the determination at the present time t at which the difference value between the yaw angular velocities γgn and γt falls within the allowable range, but the difference values between the yaw angular velocities γca and γt and between the yaw angular velocities γca and γgn fall outside the allowable range is made that there is an abnormality in the camera 221 and there is no abnormality in the other elements 222 and 240.

The determination block 124 identifies the gyroscope 240 in the sensor system 2 and determines that there is an abnormality when Contrast Expressions 6 and 8 are satisfied and Contrast Expression 7 is not satisfied. In other words, the determination of the present time t at which the difference values between the yaw angular velocities γca and γt and between the yaw angular velocities γca and γgn fall within the allowable range, but the difference value between the yaw angular velocities γgn and γt falls outside the allowable range is made that there is an abnormality in the gyroscope 240 and there is no abnormality in the other elements 221 and 222.

When the Contrast Expression 6 is satisfied and the Contrast Expressions 7 and 8 are not satisfied, the determination block 124 identifies the GNSS receiver 222 in the sensor system 2 and determines that there is an abnormality. In other words, the determination of the present time t at which the difference value between the yaw angular velocities γca and γt falls within the allowable range, but the difference values between the yaw angular velocities γgn and γt and between the yaw angular velocities γca and γgn fall outside the allowable range is made that there is an abnormality in the GNSS receiver 222 and there is no abnormality in the other elements 221 and 240.

The determination block 124 identifies the gyroscope 240 in the sensor system 2 and determines that there is an abnormality when Contrast Expression 8 is satisfied and Contrast Expressions 6 and 7 are not satisfied. In other words, the determination of the present time t at which the difference value between the yaw angular velocities γca and γgn falls within the allowable range, but the difference values between the yaw angular velocities γca and γt and between the yaw angular velocities γgn and γt fall outside the allowable range is made that there is an abnormality in the gyroscope 240 and there is no abnormality in the other elements 221 and 222.

When all of Contrast Expressions 6 to 8 are not satisfied, the determination block 124 identifies up to the external sensor 22 in the sensor system 2, and determines that there is an abnormality. In other words, the determination of the present time t at which the difference value of the yaw angular velocity γt from each of the yaw angular velocities γca and γgn fall outside the allowable range and the difference value between the yaw angular velocities γca and γgn also falls outside the allowable range is made that there is an abnormality in the external sensor 22, which is at least one of the camera 221 and the GNSS receiver 222, and there is no abnormality in the gyroscope 240.

In any of the conditions (that is, in each case) under which the determination that there is an abnormality is made as described above, the determination block 124 determines there is an abnormality if a failure of Contrast Expression continues for a set time or longer. This makes it possible to improve the robustness of the determination for a disturbance. The determination result of the determination block 124 is used in the vehicle 3 as, for example, status information of the sensor system 2.

Figure 8:
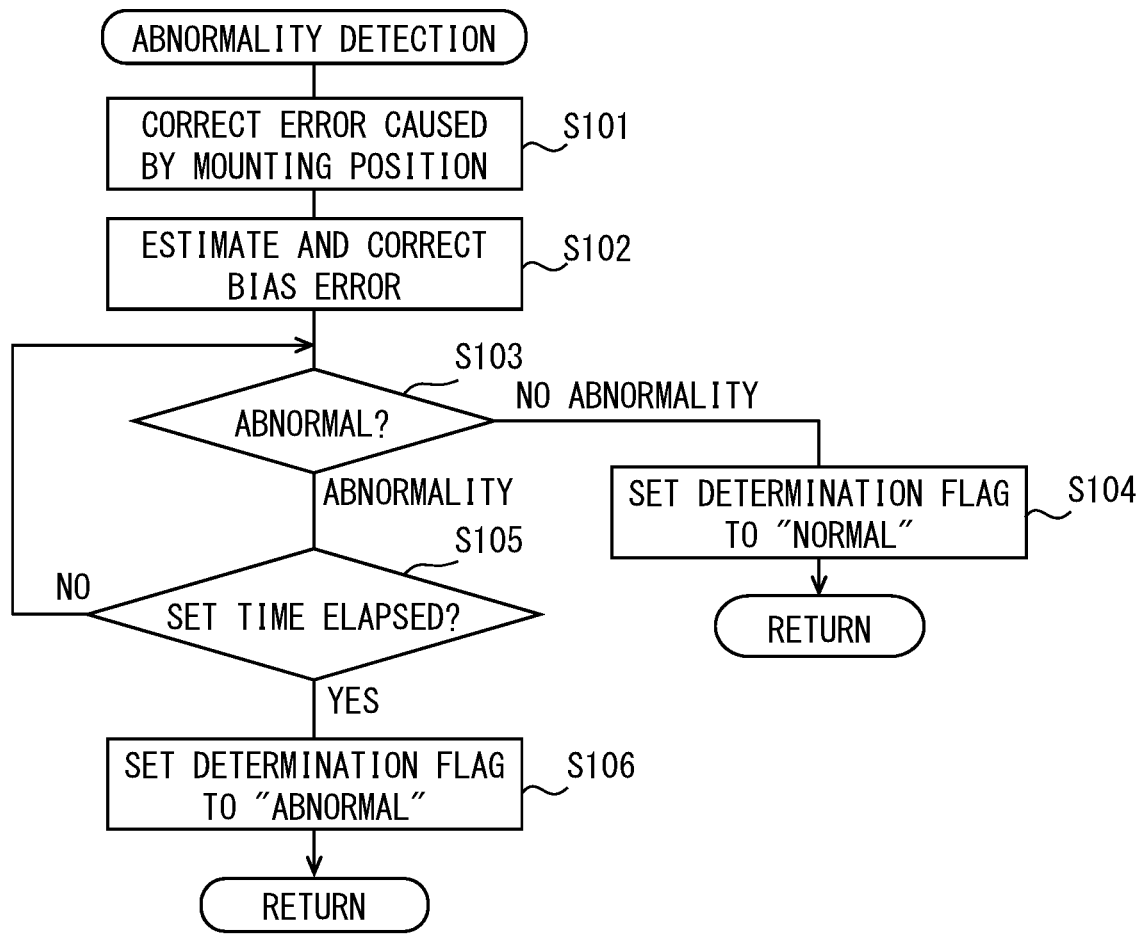
FIG. 8 is a flowchart showing an abnormality detection method according to the first embodiment.

A flow of the abnormality detection method in which the abnormality detection device 1 detects the abnormality of the sensor system 2 by the cooperation of the correction block 120 and the determination block 124 described so far will be described below with reference to FIG. 8. In a flow to be described later, "S" means multiple steps of the flow to be executed by multiple instructions included in an abnormality detection program.

In S101, the mounting correction unit 121 of the correction block 120 executes correction of an error caused by a mounting position of the sensor system 2. At this time, the sub-correction unit 121*ca* of the mounting correction unit 121 corrects the error of the yaw angular velocity γca based on the information acquired by the camera 221. The sub-correction unit 121*gn* of the mounting correction unit 121 corrects the error of the yaw angle θgn based on the information acquired by the GNSS receiver 222, and sets a time differential value of the corrected yaw angle θgn as the yaw angular velocity γgn. The sub-correction unit 121*gy* of the mounting correction unit 121 corrects the error of the yaw angular velocity γgy based on the information acquired by the gyroscope 240.

Next, in S102, the estimation and correction of the bias error Bt occurring in the yaw angular velocity γgy based on the information acquired by the gyroscope 240 are performed by the internal correction unit 122 of the correction block 120. At this time, the internal correction unit 122 uses the yaw angular velocity γca and the yaw angle θgn, which are subjected to the error correction in S101, as the motion physical quantities based on the information acquired by the camera 221 and the information acquired by the GNSS receiver 222, in Observation Expressions 4 and 5 of the Kalman filter. The internal correction unit 122 estimates the bias error Bt, the yaw angular velocity γt in which the bias error Bt has been corrected for the yaw angular velocity γgy, and the variance σt of the yaw angular velocity γt by passing the Kalman filter assuming the Prediction Expressions 1 to 3 together with Observation Expressions 4 and 5.

In the following S103, the abnormality determination of the sensor system 2 is executed by the determination block 124. At this time, the determination block 124 uses the yaw angular velocity γt after the error correction in S101 and S102 as the motion physical quantity based on the information acquired by the gyroscope 240 in Contrast Expressions 6 and 7. The determination block 124 also use the yaw angular velocities γca and γgn after error correction in S101 as the motion physical quantities based on the information acquired by the camera 221 and the information acquired by the GNSS receiver 222 in Contrast Expressions 6 to 8. The determination block 124 determines whether or not there is an abnormality in each of the elements 221, 222, and 240 in the sensor system 2 according to Contrast Expressions 6 to 8.

In response to the fact that all of the elements 221, 222, and 240 are normal at the present time t, when it is determined that there is no abnormality in S103, the process proceeds to S104. In S104, the determination flag is set to "normal" by the determination block 124, so that the determination that there is an abnormality is made, and then the process returns to S101.

On the other hand, in response to the fact that any one of the elements 221, 222, and 240 is abnormal at the present time t, when it is determined that there is an abnormality in the faulty element in S103, the process proceeds to S105. In S105, the determination block 124 determines whether or not a set time has elapsed since the most recent time when a determination flag is switched from "normal" to "abnormal". As a result, the process returns to S103 when it is determined that the set time has not yet elapsed, while the process proceeds to S106 when it is determined that the set time has elapsed. In S106, the determination flag is set to "abnormal" by the determination block 124, so that it is determined that the abnormality of the sensor system 2 has continued for the set time or longer, and after the determination that there is an abnormality is made, the process returns to S101. It should be noted that until the abnormality is alleviated or eliminated after the determination that there is an abnormality in S106 is made, the status information on the sensor system 2 may be utilized in motion estimation of the vehicle 3 such as self-location estimation or the like by execution of other programs stored in the memory 10.

Operation and Effects

The operation and effects of the first embodiment described above will be described below.

In the first embodiment, the bias error Bt of the yaw angular velocity γgy based on the information acquired by the gyroscope 240 can be accurately estimated based on the information acquired by the camera 221 and the GNSS receiver 222. In addition, the yaw angular velocities γca and γgn based on information acquired by the camera 221 and the GNSS receiver 222 are contrasted with each other, together with the yaw angular velocity γt in which the bias error Bt has been corrected for the yaw angular velocity γgy. This makes it possible not only to determine where there is an abnormality in the sensor system 2 as a whole, but also to accurately specify the sensor with an abnormality and the sensor with no abnormality. According to the above configuration, the abnormality of the sensor system 2 can be accurately detected.

In the first embodiment, it is assumed that the difference value between each of the yaw angular velocities γca and γgn and the yaw angular velocity γt falls within the allowable range based on the variance σt of the yaw angular velocity γt. In this case, the determination that there is no abnormality in the sensor system 2 as a whole can be accurately made based on the variance σt of the yaw angular velocity γt in which the accurately estimated bias error Bt has been corrected.

In the first embodiment, when the difference value between the yaw angular velocities γca and γt falls outside the allowable range based on the variance σt of the yaw angular velocity γt, it is predicted that either the camera 221 or the gyroscope 240 is abnormal. Therefore, as a further condition, it is assumed that the difference value between the yaw angular velocities γca and γgn falls within the allowable range based on the respective variances σca and σgn of the yaw angular velocities γca and γgn. In this case, the gyroscope 240 in the sensor system 2 can be accurately identified, and it can be determined that there is an abnormality. On the other hand, as a further condition, it is assumed that the difference value between the yaw angular velocities γca and γgn falls outside the allowable range based on the respective variances σca and σgn of the yaw angular velocities γca and γgn. In this case, the camera 221 in the sensor system 2 can be accurately identified and it can be determined that there is an abnormality.

In the first embodiment, when the difference value between the yaw angular velocities γgn and γt falls outside the allowable range based on the variance σt of the yaw angular velocity γt, it is predicted that either the GNSS receiver 222 or the gyroscope 240 is abnormal. Therefore, as a further condition, it is assumed that the difference value between the yaw angular velocities γca and γgn falls within the allowable range based on the respective variances σca and σgn of the yaw angular velocities γca and γgn. In this case, the gyroscope 240 in the sensor system 2 can be accurately identified, and it can be determined that there is an abnormality. On the other hand, as a further condition, it is assumed that the difference value between the yaw angular velocities γca and γgn falls outside the allowable range based on the respective variances σca and σgn of the yaw angular velocities γca and γgn. In this instance, the GNSS receiver 222 in the sensor system 2 can be accurately identified and it can be determined that there is an abnormality.

In the first embodiment, the "internal motion physical quantity" which is an object of the estimation and correction of the bias error Bt and is based on the determination that there is an abnormality, and the "first and second external motion physical quantities" which are based on the abnormality determination are the yaw angular velocities γgy, γt, γca, and γgn among the "angular velocities" of the vehicle 3. In this manner, focusing on the "specific contrast motion physical quantities" of the yaw angular velocities γgy, γt, γca, and γgn, the processes from the estimation and correction of the bias error Bt to the abnormality determination can be accurately executed.

Second Embodiment

Figure 9:
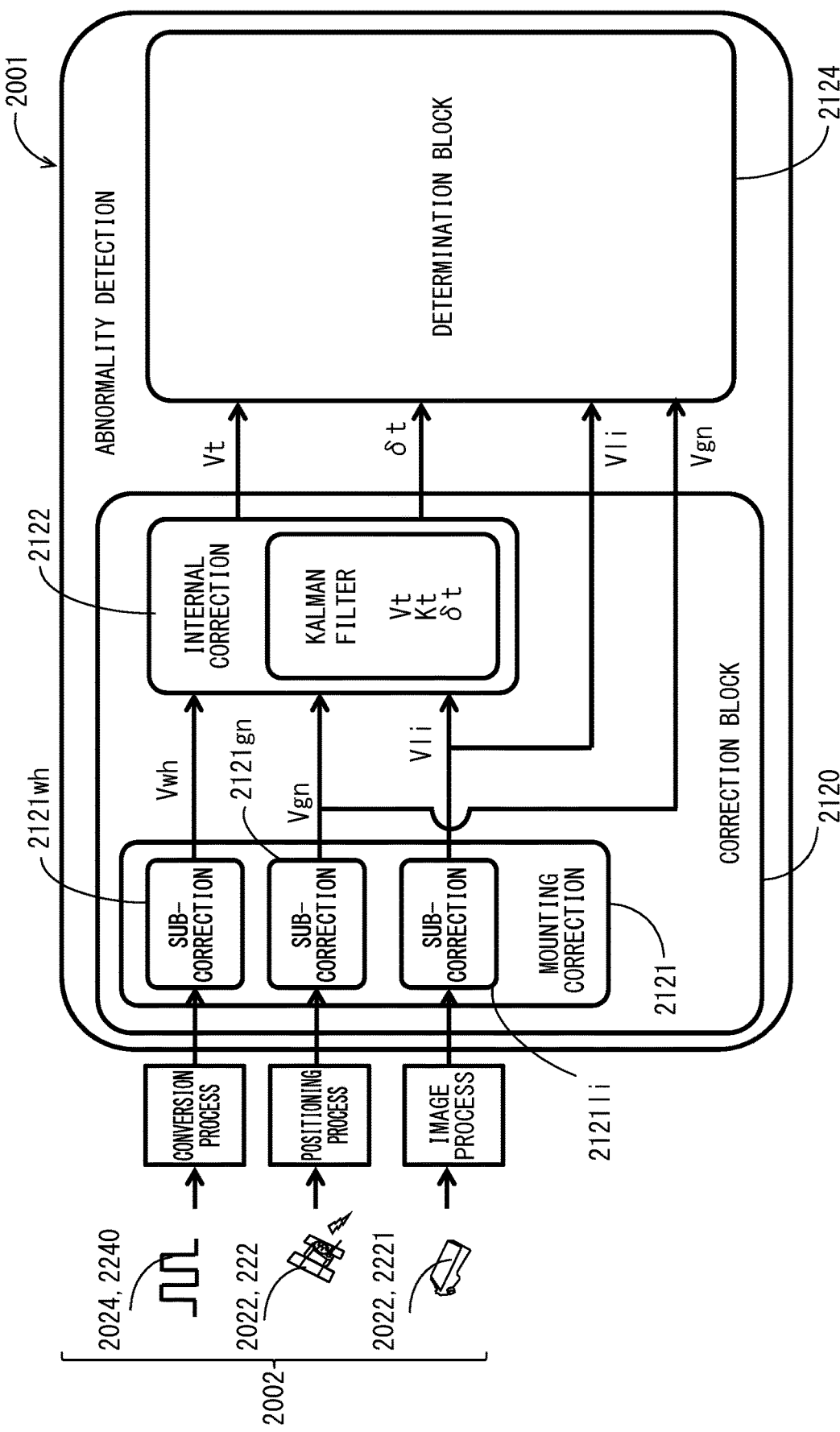
FIG. 9 is a block diagram showing a detailed configuration of an abnormality detection device according to a second embodiment.

As shown in FIG. 9, a second embodiment is a modification of the first embodiment. In the second embodiment, an LIDAR 2221 which is "a first external sensor" is employed together with a GNSS receiver 222 which is "a second external sensor" as at least two external sensors 2022 required for a sensor system 2002. In the second embodiment, a wheel speed sensor 2240 is employed as at least one internal sensor 2024 necessary for the sensor system 2002.

The functional blocks established by the abnormality detection device 2001 according to the second embodiment include a correction block 2120 and a determination block 2124 corresponding to the sensor system 2002 having a configuration different from that of the first embodiment. Specifically, in the correction block 2120 according to the second embodiment, a mounting correction unit 2121 corrects an error caused by a difference in mounting position in a vehicle 3 between elements 2221, 222, and 2240 of the sensor system 2002.

More specifically, a velocity Vli of the vehicle 3 is input to a sub-correction unit 2121*li* of the mounting correction unit 2121 by image processing based on the image information acquired by a LIDAR 2221. The sub-correction unit 2121*li* corrects an error caused by the mounting position included in the velocity Vli based on preset information at the time of factory shipment, for example. The sub-correction unit 2121*li* inputs the velocity Vli whose error has been corrected to each of the internal correction unit 2122 and the determination block 2124.

A velocity Vgn of the vehicle 3 is input to the sub-correction unit 2121*gn* of the mounting correction unit 2121 by the positioning process based on the positioning information acquired by the GNSS receiver 222. The sub-correction unit 2121*gn* corrects an error caused by the mounting position included in the velocity Vgn based on preset information, for example, at the time of factory shipment or the like. The sub-correction unit 2121*gn* inputs the velocity Vgn whose error has been corrected to each of the internal correction unit 2122 and the determination block 2124.

A velocity Vwh of the vehicle 3 is input to a sub-correction unit 2121*wh* of the mounting correction unit 2121 by a conversion process based on the wheel speed information of the vehicle 3 acquired by the wheel speed sensor 2240. The sub-correction unit 2121*wh* corrects an error caused by the mounting position included in the velocity Vwh based on preset information at the time of shipment from a factory, for example. The sub-correction unit 2121*wh* inputs the velocity Vwh whose error has been corrected to the internal correction unit 2122.

In the correction block 2120 according to the second embodiment, the internal correction unit 2122 estimates the amount of variation from a true value of the velocity Vwh (that is, Vt estimated to be described later) as a sensitivity error Kt generated in the velocity Vwh based on the information acquired by the wheel speed sensor 2240, and corrects the sensitivity error Kt on the velocity Vwh. Therefore, the internal correction unit 2122 estimates and corrects the sensitivity error Kt by passing the Kalman filter as shown in FIG. 9. In the Kalman filter according to the second embodiment, the following Prediction Expressions 9 and 10 relating to the wheel speed sensor 2240 are assumed.

[Ex. 4]

$$V_t = K_t \cdot V_{wh} + w_v \quad \text{Expression 9}$$

$$K_t = K_{t-1} + w_K \quad \text{Expression 10}$$

Specifically, Prediction Expression 9 is expressed by use of the velocity Vt predicted at the present time t, the sensitivity error Kt of the wheel speed sensor 2240 predicted at the present time t, the velocity Vwh based on the information acquired by the wheel speed sensor 2240 observed at the present time t, and the system noise wv. Prediction Expression 10 is expressed by use of the sensitivity errors Kt and Kt-1 predicted at the present time t and the previous time t-1, and the system noise wk.

The Kalman filter according to the second embodiment also assumes the following Observation Expressions 11 and 12 for each of the LIDAR 2221 and GNSS receiver 222.

[Ex. 5]

$$V_{li} = V_t + w_{li} \quad \text{Expression 11}$$

$$V_{gn} = V_t + w_{gn}' \quad \text{Expression 12}$$

Specifically, Observation Expression 11 is expressed by use of the velocity Vli based on the information acquired by the LIDAR 2221 observed at the present time t, the velocity Vt predicted at the present time t, and the observation noise wli. Observation Expression 12 is expressed by use of the velocity Vgn based on the information acquired by the GNSS receiver 222 observed at the present time t, the velocity Vt predicted at the present time t, and an observation noises wgn'.

In the Kalman filter according to the second embodiment, a covariance matrix for Vt and Kt and their motion physical quantities shown in FIG. 9 is derived by an estimation calculation based on a determinant representing Prediction Expressions 9 and 10 and a determinant representing Observation Expressions 11 and 12. As a result, the sensitivity error Kt and the velocity Vt in which the sensitivity error Kt has been corrected on the velocity Vwh are estimated. At the same time, the variance δt corresponding to the estimated velocity Vt is estimated from the covariance matrix as shown in FIG. 9. The internal correction unit 2122 inputs the estimated velocity Vt and variance δt to the determination block 2124.

The determination block 2124 according to the second embodiment contrasts the velocity Vli as the "first external motion physical quantity", the velocity Vgn as the "second external motion physical quantity", and the velocity Vt as the "internal motion physical quantity" with each other. As described above, in the second embodiment, the velocities Vt, Vli, and Vgn of the vehicle 3 correspond to the "specific contrast motion physical quantity" contrasted at the time of abnormality determination as the physical quantity related to the motion of the vehicle 3.

Therefore, the determination block 2124 determines whether or not there is an abnormality in the sensor system 2002 in accordance with the following Contrast Expressions 13 to 15 for contrasting the velocities Vt, Vli, and Vgn with each other.

[Ex. 6]

$$|V_t - V_{li}| < m \cdot \sqrt{\delta_t^2 + \delta_{li}^2} \qquad \text{Expression 13}$$

$$|V_t - V_{gn}| < m \cdot \sqrt{\delta_t^2 + \delta_{gn}^2} \qquad \text{Expression 14}$$

$$|V_{gn} - V_{li}| < m \cdot \sqrt{\delta_{gn}^2 + \delta_{li}^2} \qquad \text{Expression 15}$$

Specifically, Contrast Expression 13 is established when an absolute difference of the left side, which is a difference value between the velocity Vli and the velocity Vt falls within an allowable range which is less than a threshold of the right side. In Contrast Expression 13, δt and δli are the variances of the velocities Vt and Vli after error correction, respectively, and m is a multiple of a standard deviation that determines the allowable range. In other words, in Contrast Expression 13, the allowable range is set based on the variance δt of the velocity Vt whose sensitivity error Kt has been corrected with respect to the wheel speed sensor 2240, and the variance δli of the velocity Vli with respect to the LIDAR 2221.

Contrast Expression 14 is established when an absolute difference of the left side, which is a difference value between the velocity Vgn and the velocity Vt, falls within an allowable range that is less than the threshold value of the right side. In Contract Expression 14, δt and δgn are the variances of the velocities Vt and Vgn after error correction, respectively, and m is a multiple of the standard deviation that determines the allowable range. In other words, in Contract Expression 14, the allowable range is set based on the variance δt of the velocity Vt whose sensitivity error Kt has been corrected with respect to the wheel speed sensor 2240, and the variance δgn of the velocity Vgn with respect to the GNSS receiver 222.

Contrast Expression 15 is established when an absolute difference of the left side, which is a difference value between the velocity Vli and the velocity Vgn, falls within the allowable range that is less than the threshold of the right side. In Contract Expression 15, δli and δgn are the variances of the velocities Vli and Vgn after error correction, respectively, and m is a multiple of the standard deviation that determines the allowable range. In other words, in Contract Expression 15, the allowable range is set based on the respective variances δli and δgn of the velocities Vli and Vgn with respect to the LIDAR 2221 and the GNSS receiver 222.

As shown in FIG. 10, the determination block 2124 determines that there is no abnormality in the sensor system 2002 when all of Contrast Expressions 13 to 15 are satisfied. In other words, the determination of the present time t at which the difference value of the velocity Vt from each of the velocities Vli and Vgn falls within the allowable range and the difference value between the velocities Vli and Vgn falls within the allowable range is made that there is no abnormality in all of the elements 2221, 222, and 2240 in the sensor system 2002. The possibility that Contrast Expression 15 is not satisfied when Contrast Expressions 13 and 14 are satisfied is extremely low under the estimation through the Kalman filter described above. Therefore, it may be determined that there is no abnormality in the sensor system 2002 with only the establishment of Contrast Expressions 13 and 14 regardless of whether Contrast Expression 15 is established.

The determination block 2124 identifies the wheel speed sensor 2240 in the sensor system 2002 and determines there is an abnormality when Contrast Expressions 14 and 15 are satisfied and Contrast Expression 13 are not satisfied. In other words, the determination of the present time t at which the difference values between the velocities Vgn and Vt and between the velocities Vli and Vgn fall within the allowable range, but the difference value between the velocities Vli and Vt falls outside the allowable range is made that there is an abnormality in the wheel speed sensor 2240 and there is no abnormality in the other elements 2221 and 222.

The determination block 2124 identifies the LIDAR 2221 in the sensor system 2002 and determines that there is an abnormality, when Contrast Expressions 13 and 15 are not satisfied while Contrast Expression 14 is satisfied. In other words, the determination of the present time t at which the difference value between the velocities Vgn and Vt falls within the allowable range, but the difference values between the velocities Vli and Vt and between the velocities Vli and Vgn fall outside the allowable range is made that there is an abnormality in the LIDAR 2221 and there is no abnormality in the other elements 222 and 2240.

The determination block 2124 identifies the wheel speed sensor 2240 in the sensor system 2002 and determines there is an abnormality when Contrast Expressions 13 and 15 are satisfied and Contrast Expression 14 is not satisfied. In other words, the determination of the present time t at which the difference values between the velocities Vli and Vt and between the velocities Vli and Vgn fall within the allowable range, but the difference value between the velocities Vgn and Vt falls outside the allowable range is made that there is an abnormality in the wheel speed sensor 2240 and there is no abnormality in the other elements 2221 and 222.

When Contrast Expression 13 is satisfied and Contrast Expressions 14 and 15 are not satisfied, the determination block 2124 identifies the GNSS receiver 222 in the sensor system 2002 and determines that there is an abnormality. In other words, the determination of the present time t at which the difference value between the velocities Vli and Vt falls within the allowable range, but the difference values between the velocities Vgn and Vt and between the velocities Vli and Vgn fall outside the allowable range is made that there is an abnormality in the GNSS receiver 222 and there is no abnormality in the other elements 2221 and 2240.

The determination block 2124 identifies the wheel speed sensor 2240 in the sensor system 2002 and determines there is an abnormality when Contrast Expression 15 is satisfied and Contrast Expressions 13 and 14 are not satisfied. In other words, the determination of the present time t at which the difference value between the velocities Vli and Vgn falls within the allowable range, but the difference value between the velocities Vgn and Vt falls outside the allowable range is made that there is an abnormality in the wheel speed sensor 2240 and there is no abnormality in the other elements 2221 and 222.

When all of Contrast Expressions 13 to 15 are not satisfied, the determination block 2124 identifies up to the external sensor 2022 in the sensor system 2002, and determines that there is an abnormality. In other words, the determination of the present time t at which the difference value of the velocity Vt from each of the velocities Vli and Vgn falls outside the allowable range and the difference value between the velocities Vli and Vgn also falls outside the allowable range is made that there is an abnormality in the external sensor 2022 which is at least one of the LIDAR 2221 and the GNSS receiver 222 and there is no abnormality in the wheel speed sensor 2240.

The determination block 2124 according to the second embodiment also determines that there is an abnormality when the failure of Contrast Expression continues for a set time or longer under each condition in which the determination that there is an abnormality is made as described above. This makes it possible to improve the robustness of the determination for a disturbance. The determination result of the determination block 2124 is used in the vehicle 3 as, for example, status information of the sensor system 2002.

Figure 11:
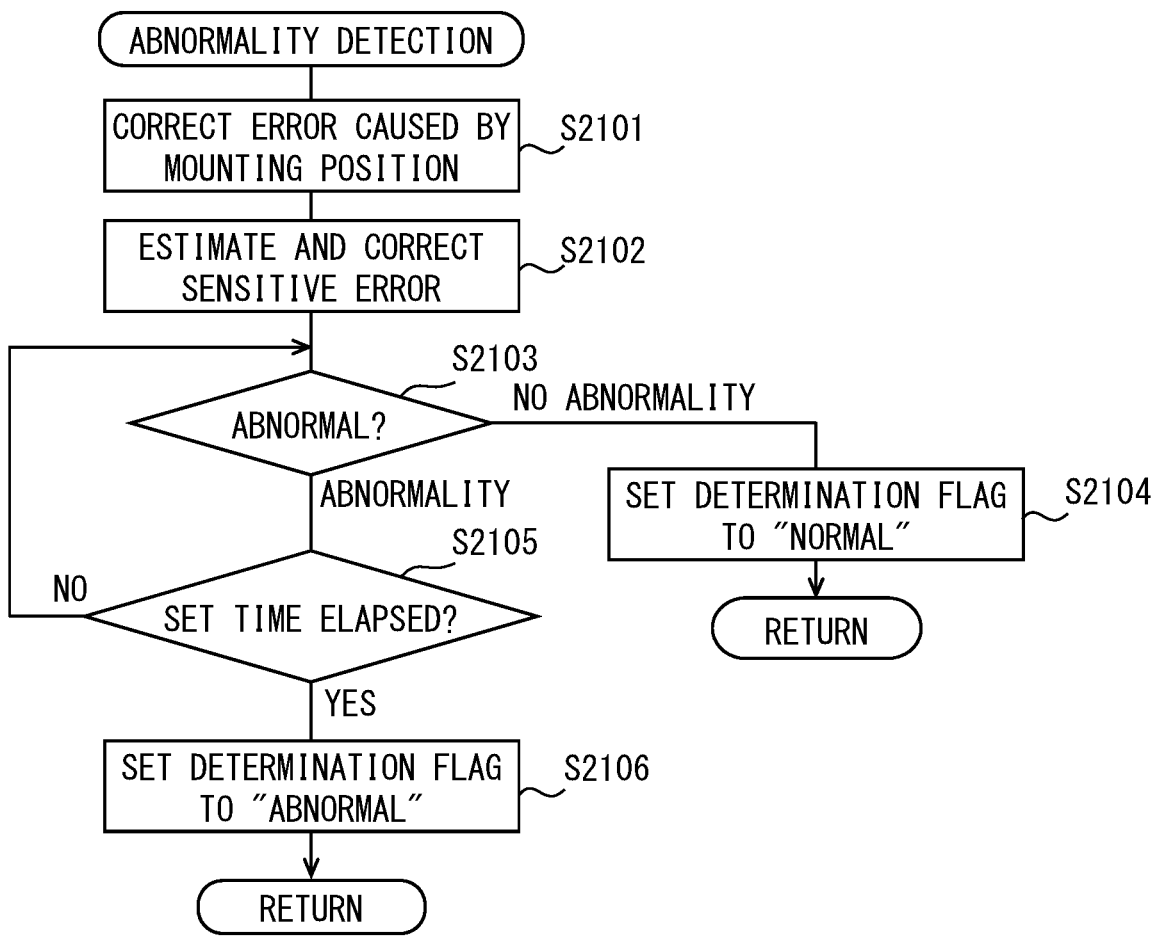
FIG. 11 is a flowchart showing an abnormality detection method according to the second embodiment.

A flow of the abnormality detection method in which the abnormality detection device 2001 detects the abnormality of the sensor system 2002 by the cooperation of the correction block 2120 and the determination block 2124 described so far will be described below with reference to FIG. 11.

In S2101, the mounting correction unit 2121 of the correction block 2120 corrects an error caused by the mounting position of the sensor system 2002. At that time, the sub-correction unit 2121*li* of the mounting correction unit 2121 corrects an error of the velocity Vli based on the information acquired by the LIDAR 2221. The sub-correction unit 2121*gn* of the mounting correction unit 2121 corrects the error of the velocity Vgn based on the information acquired by the GNSS receiver 222. The sub-correction unit 2121*wh* of the mounting correction unit 2121 corrects the error of the velocity Vwh based on the information acquired by the wheel speed sensor 2240.

Next, in S2102, estimation and correction of the sensitivity error Kt occurring in the velocity Vwh based on the information acquired by the wheel speed sensor 2240 are performed by the internal correction unit 2122 of the correction block 2120. At this time, the internal correction unit 2122 uses the velocities Vli and Vgn subjected to the error correction in S2101 as the motion physical quantities based on the information acquired by the LIDAR 2221 and the information acquired by the GNSS receiver 222 in Observation Expressions 11 and 12 of the Kalman filter. The internal correction unit 2122 estimates the sensitivity error Kt, the velocity Vt in which the sensitivity error Kt has been corrected on the velocity Vwh, and the variance δt of the velocity Vt by passing the Kalman filter assuming Prediction Expressions 9 and 10 together with Observation Expressions 11 and 12.

In the following S2103, the abnormality determination in the sensor system 2002 is performed by the determination block 2124. At that time, the determination block 2124 uses the velocity Vt after error correction in S2101 and S2102 as the motion physical quantity based on the information acquired by the wheel speed sensor 2240 in Contrast Expressions 13 and 14. The determination block 2124 also uses the velocities Vli and Vgn after error correction in S2101 as motion physical quantities based on the information acquired by the LIDAR 2221 and GNSS receiver 222 in Contrast Expressions 13 to 15. The determination block 2124 determines whether or not there is an abnormality for each of the elements 2221, 222, and 2240 of the sensor system 2002 according to Contrast Expressions 13 to 15 described above.

When it is determined that there is no abnormality in S2103 in response to the fact that all of the elements 2221, 222, and 2240 are normal at the present time t, the process proceeds to S2104 which is the same as S104 of the first embodiment. On the other hand, when it is determined that the faulty element is abnormal in S2103 in response to the fact that any one of the elements 2221, 222, and 2240 is abnormal at the present time t, the process proceeds to S2105 which is the same as S105 of the first embodiment. However, in S2105 of the second embodiment, when it is determined that the set time has not elapsed, the process returns to S2103, while when it is determined that the set time has elapsed, the process proceeds to S2106 which is the same as S106 of the first embodiment.

Operation and Effects

The operation and effect of the second embodiment described above will be described below.

In the second embodiment, the sensitivity error Kt of the velocity Vwh based on the information acquired by the wheel speed sensor 2240 can be accurately estimated based on the information acquired by each of the LIDAR 2221 and the GNSS receiver 222. Moreover, the velocity Vt, which is the velocity Vwh whose sensitivity error Kt has been corrected, as well as the velocities Vli and Vgn based on the information acquired by each of the LIDAR 2221 and GNSS receiver 222, are contrasted with each other. This makes it possible not only to determine where there is an abnormality in the sensor system 2002 as a whole, but also to accurately specify the sensor with an abnormality and the sensor with no abnormality. According to the above configuration, the abnormality of the sensor system 2002 can be accurately detected.

In the second embodiment, it is assumed that the difference value between each of the velocities Vli and Vgn and the velocity Vt falls within the allowable range based on the variance δt of the velocity Vwh. In this case, the determination that there is no abnormality in the sensor system 2002 as a whole can be accurately made based on the variance δt of the velocity Vt in which the accurately estimated sensitivity error Kt has been corrected.

In the second embodiment, when the difference value between the velocities Vli and Vt falls outside the allowable range based on the variance δt of the velocity Vwh, it is predicted that either the LIDAR 2221 or the wheel speed sensor 2240 is abnormal. Therefore, as a further condition, it is assumed that the difference value between the velocities Vli and Vgn falls within the allowable range based on the variances δli and σgn of the velocities Vli and Vgn, respectively. In this case, the wheel speed sensor 2240 in the sensor system 2002 can be accurately identified, and it can be determined that there is an abnormality. On the other hand, as a further condition, it is assumed that the difference value between the velocities Vli and Vgn falls outside the allowable range based on the respective variances δli and σgn of the velocities Vli and Vgn. In this instance, the LIDAR 2221 of the sensor system 2002 can be correctly identified, and it can be determined that there is an abnormality.

In the second embodiment, when the difference value between the velocities Vgn and Vt falls outside the allowable range based on the variance δt of the velocity Vwh, it is predicted that either the GNSS receiver 222 or the wheel speed sensor 2240 is abnormal. Therefore, as a further condition, it is assumed that the difference value between the velocities Vli and Vgn falls within the allowable range based on the variances δli and δgn of the velocities Vli and Vgn, respectively. In this case, the wheel speed sensor 2240 in the sensor system 2002 can be accurately identified, and it can be determined that there is an abnormality. On the other hand, as a further condition, it is assumed that the difference value between the velocities Vli and Vgn falls outside the allowable range based on the variances δli and δgn of the velocities Vli and Vgn, respectively. In this instance, the GNSS receiver 222 in the sensor system 2002 can be accurately identified and it can be determined that there is an abnormality.

In the second embodiment, both of the "internal motion physical quantity" which is an object of the estimation and correction of the sensitivity error Kt and is based on the abnormality determination and the "first and second external motion physical quantities" which are based on the abnormality determination are the velocities Vwh, Vt, Vli, and Vgn of the vehicle 3. Focusing on the specific "contrast motion physical quantities" of the velocities Vwh, Vt, Vli, and Vgn in this manner, the process from the estimation and correction of the sensitivity error Kt to the determination of the abnormality can be accurately executed.

Other Embodiments

Although multiple embodiments have been described above, the present disclosure is not construed as being limited to those embodiments, and can be applied to various embodiments and combinations within a scope that does not depart from the spirit of the present disclosure.

Specifically, in Modification 1 relating to the first and second embodiments, the allowable range may be assumed in a range where the absolute difference of the left side is equal to or less than the threshold of the right side in Contrast Expressions 6 to 8 and 13 to 15. In Modification 2 relating to the first and second embodiments, the error correction by the mounting correction units 121 and 2121 may not be executed with omission of S101 and S201.

In Modification 3 relating to the first and second embodiments, the determination of the presence of abnormality may be determined in S103 an S2103 with omission of S105 and S2105. In Modification 4 relating to Modification 3, S104, S106, S2104, and S2106 may be further omitted.

In a Kalman filter of Modification 5 relating to the first embodiment, instead of the bias error Bt, a sensitivity error according to the second embodiment may be estimated and corrected. In a Kalman filter of Modification 6 relating to the first embodiment, since one of Observation Expressions 4 and 5 based on the information acquired from the camera 221 and the GNSS receiver 222 is not assumed, the estimation and correction may be performed from the other of Observation Expressions 4 and 5 and Prediction Expressions 1 to 3. In a Kalman filter of Modification 7 relating to the second embodiment, since one of Observation Expressions 11 and 12 based on the information acquired from the LIDAR 2221 and the GNSS receiver 222 is not assumed, the estimation and correction may be performed from the other of Observation Expressions 11 and 12 and Prediction Expressions 9 and 10.

Abnormality detection devices 1 and 2001 according to Modification 8 of the first and second embodiments may be a computer configured to include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

In addition to the above modification, in Modification 9, a pair of at least two external sensors 22 and at least one internal sensor 24 may be other than the pair described in the first or second embodiment, and a Kalman filter corresponding to the pair is appropriately used.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An abnormality detection device that detects an abnormality of a sensor system which is mounted on a vehicle and includes a first external sensor and a second external sensor that acquire external information and an internal sensor that acquires internal information, the abnormality detection device comprising:

a correction block that estimates an error, occurring in an internal motion physical quantity based on the internal information acquired by the internal sensor as a specific comparison motion physical quantity, based on the external information acquired by at least one of the first external sensor and the second external sensor, and corrects the error; and a determination block that compares a first external motion physical quantity based on the external information acquired by the first external sensor as a comparison motion physical quantity, a second external motion physical quantity based on the external information acquired by the second external sensor as another comparison motion physical quantity, and the internal motion physical quantity in which the error is corrected by the correction block, and determines an abnormality in the sensor system, wherein:

the specific comparison motion physical quantity includes the internal motion physical quantity, the first external motion physical quantity and the second external motion physical quantity.

2. The abnormality detection device according to claim 1, further comprising:

one or more processors; and a memory coupled to the one or more processors and storing program instructions that when executed by the one or more processors cause the one or more processors to provide at least the correction block and the determination block.

3. The abnormality detection device according to claim 1, wherein:

when each of a difference between the first external motion physical quantity and the internal motion physical quantity and a difference between the second external motion physical quantity and the internal motion physical quantity falls within an allowable range defined based on a variance of the internal motion physical quantity in which the error is corrected by the correction block; and the determination block determines that the sensor system has no abnormality.

4. The abnormality detection device according to claim 3, wherein:

when the difference between the first external motion physical quantity and the internal motion physical quantity not fall within the allowable range defined based on the variance of the internal motion physical quantity in which the error is corrected by the correction block, and a difference between the first external motion physical quantity and the second external motion physical quantity falls within an allowable range defined based on a variance of each of the first external motion physical quantity and the second external motion physical quantity, the determination block determines that the internal sensor in the sensor system has the abnormality.

5. The abnormality detection device according to claim 3, wherein:

when the difference between the first external motion physical quantity and the internal motion physical quantity does not fall within the allowable range defined based on the variance of the internal motion physical quantity in which the error is corrected by the correction block, and a difference between the first external motion physical quantity and the second external motion physical quantity does not fall within an allowable range defined based on a variance of each of the first external motion physical quantity and the second external motion physical quantity, the determination block determines that the first external sensor in the sensor system has the abnormality.

6. The abnormality detection device according to claim 3, wherein:

when the difference between the second external motion physical quantity and the internal motion physical quantity does not fall within the allowable range defined based on the variance of the internal motion physical quantity in which the error is corrected by the correction block, and a difference between the first external motion physical quantity and the second external motion physical quantity falls within an allowable range defined based on a variance of each of the first external motion physical quantity and the second external motion physical quantity, the determination block determines that the internal sensor in the sensor system has the abnormality.

7. The abnormality detection device according to claim 3, wherein:

when the difference between the second external motion physical quantity and the internal motion physical quantity does not fall within the allowable range defined based on the variance of the internal motion physical quantity in which the error is corrected by the correction block, and a difference between the first external motion physical quantity and the second external motion physical quantity does not fall within an allowable range defined based on a variance of each of the first external motion physical quantity and the second external motion physical quantity, the determination block determines that the second external sensor in the sensor system has the abnormality.

8. The abnormality detection device according to claim 1, wherein:

the comparison motion physical quantity is an angular velocity of the vehicle.

9. The abnormality detection device according to claim 1, wherein:

the comparison motion physical quantity is a velocity of the vehicle.

10. An abnormality detection method for detecting an abnormality of a sensor system which is mounted on a vehicle and includes a first external sensor and a second external sensor that acquire external information and an internal sensor that acquires internal information, the abnormality detection method comprising:

estimating an error, occurring in an internal motion physical quantity based on the internal information acquired by the internal sensor as a specific comparison motion physical quantity, based on the external information acquired by at least one of the first external sensor and the second external sensor;

correcting the error;

comparing a first external motion physical quantity based on the external information acquired by the first external sensor as a comparison motion physical quantity, a second external motion physical quantity based on the external information acquired by the second external sensor as another comparison motion physical quantity, and the internal motion physical quantity in which the error is corrected; and determining an abnormality in the sensor system, wherein:

the specific comparison motion physical quantity includes the internal motion physical quantity, the first external motion physical quantity and the second external motion physical quantity.

11. A non-transitory tangible computer readable medium comprising instructions being executed by a computer, the instructions including a computer-implemented method for detecting an abnormality of a sensor system which is mounted on a vehicle and includes a first external sensor and a second external sensor that acquire external information and an internal sensor that acquires internal information, the instructions comprising:

estimating an error, occurring in an internal motion physical quantity based on the internal information acquired by the internal sensor as a specific contrast motion physical quantity, based on the external information acquired by at least one of the first external sensor and the second external sensor;

correcting the error;

comparing a first external motion physical quantity based on the external information acquired by the first external sensor as a comparison motion physical quantity, a second external motion physical quantity based on the external information acquired by the second external sensor as another comparison motion physical quantity, and the internal motion physical quantity in which the error is corrected; and determining an abnormality in the sensor system, wherein:

the specific comparison motion physical quantity includes the internal motion physical quantity, the first external motion physical quantity and the second external motion physical quantity.

* * * * *